United States Patent
Yao et al.

(10) Patent No.: US 9,446,474 B2
(45) Date of Patent: Sep. 20, 2016

(54) ELECTRODE CAP GRINDING AND CHANGING ALL-IN-ONE (AIO) MACHINE

(71) Applicant: Guangzhou MINO Automotive Equipment Co., Ltd., Guangzhou (CN)

(72) Inventors: Weibing Yao, Guangzhou (CN); Ting Zhang, Guangzhou (CN); Lianjun Zheng, Guangzhou (CN); Xingda Cao, Guangzhou (CN); Zhicheng Sun, Guangzhou (CN); Yongfeng Yang, Guangzhou (CN); Zhihao Cheng, Guangzhou (CN); Zhencheng Chen, Guangzhou (CN); Yi He, Guangzhou (CN)

(73) Assignee: Guangzhou MINO Automotive Equipment Co., Ltd., Guangzhou (CN)

( * ) Notice: Subject to any disclaimer, the term of this patent is extended or adjusted under 35 U.S.C. 154(b) by 12 days.

(21) Appl. No.: 14/656,926

(22) Filed: Mar. 13, 2015

(65) Prior Publication Data

US 2015/0258625 A1  Sep. 17, 2015

(30) Foreign Application Priority Data

Mar. 14, 2014 (CN) .......................... 2014 1 0098341
May 5, 2014 (CN) .......................... 2014 1 0186231
Nov. 5, 2014 (CN) .......................... 2014 2 0660686

(51) Int. Cl.
B24B 7/20 (2006.01)
B23K 11/30 (2006.01)

(52) U.S. Cl.
CPC ........ B23K 11/3063 (2013.01); B23K 11/3072 (2013.01)

(58) Field of Classification Search
CPC ......... B24B 7/228; B24B 9/10; B28D 1/003; B28D 5/028; B23K 11/3063; B23K 11/3072; C03B 33/04

USPC .......................................................... 451/70
See application file for complete search history.

(56) References Cited

U.S. PATENT DOCUMENTS

| | | | | |
|---|---|---|---|---|
| 4,139,161 A * | 2/1979 | Hupperich | ............... | A47J 42/04 241/162 |
| 4,690,338 A * | 9/1987 | Sayler | ..................... | B02C 13/18 241/154 |
| 6,659,379 B2 * | 12/2003 | Chen | ....................... | A47J 42/04 241/169.1 |
| 6,663,031 B2 * | 12/2003 | Henderson | ............... | A47J 42/50 241/169.1 |
| 8,083,167 B1 * | 12/2011 | Namakian | ................... | 241/169.1 |
| 9,022,838 B2 * | 5/2015 | Tamm | .................... | B24B 19/16 451/294 |
| 9,227,289 B2 * | 1/2016 | Tamm | ................ | B23K 11/3063 |
| 2004/0127149 A1 * | 7/2004 | Tamm | .................... | B24B 19/16 451/65 |
| 2008/0108284 A1 * | 5/2008 | Tamm | .................... | B24B 19/16 451/282 |
| 2013/0260648 A1 * | 10/2013 | Rementer | ............. | B24B 33/081 451/28 |

* cited by examiner

*Primary Examiner* — George Nguyen
(74) *Attorney, Agent, or Firm* — M&B IP Analysts, LLC (57) ABSTRACT

An electrode cap grinding and changing machine is provided. The machine includes a frame, a drive motor having an output end and a balanced floating unit, wherein the balanced floating unit is arranged on the frame, and the drive motor is arranged on the balanced floating unit, the output end of the drive motor penetrates through the balanced floating unit and then is connected with a working table having two sides, the two sides of the working table having a cap dismounting unit and a cap grinding unit drivably interconnected with the output end of the drive motor, and electrode cap storage units arranged at an outermost end of the two sides of the working table or on the frame.

12 Claims, 9 Drawing Sheets

ELECTRODE CAP GRINDING AND CHANGING ALL-IN-ONE (AIO) MACHINE

CROSS-REFERENCE TO RELATED APPLICATIONS

This application claims priority under 35 USC 119 from Chinese Application No. 201410098341.7 CN, filed Mar. 14, 2014, now pending, Chinese Application No. 201410186231.6 CN, filed May 5, 2014, now pending, Chinese Application No 201420660686.2 CN, filed Nov. 5, 2014, now pending.

TECHNICAL FIELD

The disclosure relates to grinding and changing applied to a resistance spot welding electrode cap of an electrode holder, particularly relates to grinding and changing applied to the electrode cap on an automatic welding production line of an automobile body in white, and belongs to the field of automobile manufacturing automated production.

BACKGROUND

In the process of welding a vehicle body in white, it is very important for the application of a grinder. After a period of time of using a welding gun, the surface of an electrode cap can be oxidized or can be glued with impurities, therefore the quality of a welding spot can be affected. The grinder plays a role in grinding the used electrode cap to be in the original appearance, therefore the quality of the welding spot can be ensured. The electrode cap cannot be ground infinitely, therefore a new electrode cap shall be changed after a certain amount of grinding times is reached.

At present, a part for grinding the cap and a part of changing the cap are separated mostly in an automobile production line, and a station is provided with an electrode cap grinder and an electrode cap changer, therefore the electrode cap grinder is used for grinding the electrode cap and the electrode cap changer is used for changing a waste electrode cap; an AIO (All-In-One) machine has not been extensively applied, even the electrode caps are dismounted and changed manually in most factories. The AIO machine has not been extensively applied and the technology has not been manure, one reason is that the difference of the working speeds of the polisher and the cap exchanger is 10 times. When a motor is used, a driving scheme is quiet difficult if large and different driving ratios need to be realized. If a servo motor or a frequency changing motor is used for switching speed, the cost is relatively expensive and an electronic control scheme is complicated. The grinder is extensively and importantly applied in the spot welding process of the whole body in white. If the grinder which is good in performance, convenient to operate, affordable in price and beautiful in appearance is researched, the design of a power source and a driving scheme is a critical part. In addition, the certain influence on beats by the appearance structure of the AIO is a very critical part.

Two driving schemes of an existing grinder are discovered through analysis in the market. One driving scheme is realized by selecting conventional cylindrical gearing, adopting same driving ratio on a polishing end and a cap changing end and realizing the speed difference of the two ends by changing the rotating speed of the motor. The servo motor and the frequency change motor can be used for changing the speeds greatly. Another scheme is that ten times of speed difference of the two ends can be realized by selecting a general single speed asynchronous motor and designing a proper gear driving mechanism.

The implementation principle of the former method is simple, but the requirements on the motor are higher. A compatibility problem exists in a servo system of a servo motor and a control system of a robot, but the frequency change motor needs to be additionally provided with a frequency change control cabinet. In addition, the cost of the AIO machine can be greatly improved by taking the two motors as the power source. However, in the second driving mechanism, the deceleration and speed difference can be realized by adopting the first drive, the processing requirements on the gear are very high, and the processing and manufacturing cost cannot be ignored. In addition to realizing the functions, the grinder needs to be compact in structure and beautiful in appearance, therefore it is difficult to select the second scheme.

SUMMARY

The disclosed embodiments aim to provide an electrode grinding and changing AIO (All-In-One) machine capable of automatically grinding and changing the electrode map without any worker, and completing a grinding process and a cap changing process on same equipment.

The solution for solving the technical problem by the electrode cap grinding and changing AIO machine is that the electrode cap grinding and changing AIO machine comprises a frame, a drive motor and a balanced floating unit, wherein the balanced floating unit is arranged on the frame, and the drive motor is arranged on the balanced floating unit, the output end of the drive motor penetrates through the balanced floating unit and then is connected with a working table, the two sides of the working table are provided with a cap dismounting unit and a cap grinding unit which are directly or indirectly connected with the output end of the drive motor in a driving way and electrode cap storage units are arranged at the outermost ends of the two sides of the working table or on the frame.

As the further improvement of the technical scheme, the output end of the drive motor is provided with an output shaft gear; the cap dismounting unit comprises a cap dismounting straight gear, a worm shaft coaxially connected with the cap dismounting straight gear, a cap dismounting worm wheel engaged with the worm shaft and an electrode cap gripper which is connected in the center of the cap dismounting worm through a rotating shaft; the electrode cap gripper is adjacently provided with a pre-tightening spring; the cap grinding unit comprises a grinding straight gear, a grinding bevel pinion coaxially provided with the grinding straight gear, a grinding bevel gear wheel engaged with the grinding bevel pinion and a grinding cutter installed in the center of the grinding bevel gear wheel; the output shaft gear is respectively engaged with the cap dismounting straight gear and the grinding straight gear.

As the further improvement of the technical scheme, the balanced floating unit comprises an upper fixed seat and a lower fixed seat which are arranged on the frame, two guide shafts socketed between the upper fixed seat and the lower fixed seat, linear bearings sleeving the outer surfaces of the guide shafts, an upper spring which is installed between the upper fixed seat and the linear bearing and sleeves the outer surface of the corresponding guide shaft, a lower spring which is installed between the lower fixed seat and the linear bearing and sleeves the outer surface of the corresponding guide shaft and a cylinder installed at the lower end plane of the lower fixed seat; the output end of the cylinder penetrates through the lower fixed seat and then is connected with a cylinder connector, the cylinder connector can be arranged on a lower stop pin at the lower end plane of the drive motor in a pressing and contacting way, and the working table is arranged on the two linear bearings.

As the further improvement of the technical scheme, a limit block is arranged at the lower end plane of the upper fixed seat, and can be arranged on an upper stop pin at the upper end plane of the drive motor in a pressing and contacting way.

As the further improvement of the technical scheme, each electrode cap storage unit comprises an electrode supports and a cover plate, one or a plurality of electrode placing slots are formed along the side walls of the electrode supports, the cover plates can be detachably arranged on the electrode supports and can be used for sealing the electrode placing slots and compression springs are arranged in the electrode placing slots; the terminals of compression springs are fixedly connected with the electrode supports, push blocks capable of pushing electrodes to slide along the electrode placing slots are arranged at the front ends of the compressing springs, and head parts protruding out the cover plates are formed on the front ends of the electrode supports; cap taking ports are formed in the head parts of the electrode placing slots, baffle blocks are arranged on the cap taking ports, and elastic mechanisms are connected with the baffle blocks and drive the baffle blocks to block the tap taking ports.

As the further improvement of the technical scheme, the elastic reset mechanism comprises baffle block supports arranged on the head parts, and hinged lugs, which are embedded into the side wall of the cap taking ports, are formed on the baffle block supports; the baffle blocks comprise hinged ends connected with the hinged lugs through the rotating shafts and baffle ends protruding into the cap taking ports, cambered surfaces which can fit the surfaces of the electrodes are formed on the end planes of the baffle ends, and the baffle block supports are provided with reset elastic members connected with the baffle blocks.

As the further improvement of the technical scheme, the reset elastic members are torsion springs arranged on the rotating shafts.

As the further improvement of the technical scheme, the electrode supports or the baffle block supports are provided with pressing plates which protrude above the electrode placing slots from the side walls of the cap taking ports.

As the further improvement of the technical scheme, guide slots are formed in the left and right side walls of the electrode placing slots, and the two sides of the push blocks are provided with guide strips embedded into the guide slots.

As the further improvement of the technical scheme, the terminals of the electrode placing slots are provided with bottom covers in the electrode supports, and the terminals of the compression springs are propped against the bottom covers.

As the further improvement of the technical scheme, each electrode placing slot comprises an upper electrode placing slot and a lower electrode placing slot which are respectively located at the upper side and lower side of the corresponding electrode support, and each cover plate comprises an upper cover plate and a lower cover plate which respectively enclose the upper electrode placing slot and the lower electrode placing slot.

As the further improvement of the technical scheme, the frame comprises a base, a mounting plate, a tray frame and a tray, wherein the mounting plate is used for installing the drive motor and the balanced floating unit, the tray frame is located below the mounting plate, and the tray is installed above the tray frame.

The electrode cap grinding and changing AIO machine provided by the disclosed embodiments has the beneficial effects that the grinding and changing of the electrode cap can be completed on equipment and the drive motor is used for realizing two functions; furthermore, the technical difficult problem of stopping to change the electrode cap on the automobile production line can be solved, and the problem that too large floor area is caused because the grinder and the cap changer are separated can be solved. In addition, by adopting the drive motor as the power source, the control system is simple, the output speed is stable and reliable and the uniformity of grinding the electrode cap every time can be ensured; finally, the grinding and changing of the electrode cap can be automatically completed, the working beats of the automobile welding production line can be improved obviously, and the capacity of the production line can be improved, therefore the electrode cap grinding and changing AIO machine is applicable to the automobile welding production line with high degree of automation.

BRIEF DESCRIPTION OF THE DRAWINGS

In order to specify the technical scheme in the embodiment of an electrode cap grinding and changing AIO machine more clearly, drawings used in the description of the embodiment can be specified in the description of the embodiment below. Obviously, the described drawings are only a part of the disclosed embodiments, but not all embodiments. Technicians in this field can obtain other design schemes and drawings in accordance with the drawings under the precondition that creative labor need not to be paid out.

DETAILED DESCRIPTION

The concept, concrete structure and generated technical effect of an electrode cap grinding and changing AIO machine can be described clearly and completely by combining the embodiments and the drawings, so as to know the target, features and effects of the electrode cap grinding and changing AIO machine completely. It should be emphasized that the described embodiments are only a part of embodiments of the electrode cap grinding and changing AIO machine, but not the all embodiments. Based on the embodiments of the electrode cap grinding and changing AIO machine, the condition, that the technicians can obtain other embodiments under the precondition of not paying out the creative labor, belongs to the protective scope of the electrode cap grinding and changing AIO machine. In addition, all linking/connection relations involved in this paper do not mean the direction connection of components, but mean a more optimal connection structure which can be formed by adding or reducing connection auxiliaries in accordance with the specific implementing conditions.

An electrode cap grinding and changing AIO (All-In-One) machine, comprising a frame 1, a drive motor 6 and a balanced floating unit 2, wherein the balanced floating unit 2 is arranged on the frame 1, and the drive motor 6 is arranged on the balanced floating unit 2, the output end of the drive motor 6 penetrates through the balanced floating unit 2 and then is connected with a working table 7, the two sides of the working table 7 are provided with a cap dismounting unit 3 and a cap grinding unit 4 which are directly or indirectly connected with the output end of the drive motor 6 in a driving way and electrode cap storage units 5 are arranged at the outermost ends of the two sides of the working table 7 or on the frame 1.

As a further preferred embodiment, the output end of the drive motor 6 is provided with an output shaft gear 60; the cap dismounting unit 3 comprises a cap dismounting straight gear 30, a worm shaft 31 coaxially connected with the cap dismounting straight gear 30, a cap dismounting worm wheel 32 engaged with the worm shaft 31 and an electrode cap gripper 33 which is connected in the center of the cap dismounting worm 32 through a rotating shaft; the electrode cap gripper 33 is adjacently provided with a pre-tightening spring 34; the cap grinding unit 4 comprises a grinding straight gear 40, a grinding bevel pinion 41 coaxially provided with the grinding straight gear 40, a grinding bevel gear wheel 42 engaged with the grinding bevel pinion 41 and a grinding cutter 43 installed in the center of the grinding bevel gear wheel 42; the output shaft gear 60 is respectively engaged with the cap dismounting straight gear 30 and the grinding straight gear 40.

As a further preferred embodiment, the balanced floating unit 2 comprises an upper fixed seat 20 and a lower fixed seat 21 which are arranged on the frame 1, two guide shafts 22 socketed between the upper fixed seat 20 and the lower fixed seat 21, linear bearings 23 sleeving the outer surfaces of the guide shafts, an upper spring 24 which is installed between the upper fixed seat 20 and the linear bearing 23 and sleeves the outer surface of one guide shaft, a lower spring 25 which is installed between the lower fixed seat 21 and the linear bearing 23 and sleeves the outer surface of the guide shaft 22 and a cylinder 26 installed at the lower end plane of the lower fixed seat 21; the output end of the cylinder 26 penetrates through the lower fixed seat 21 and then is connected with a cylinder connector 27, the cylinder connector 27 can be arranged on a lower stop pin 61 at the lower end plane of the drive motor 6 in a pressing and contacting way, and the working table 7 is arranged on the two linear bearings.

As a further preferred embodiment, a limit block 28 is arranged at the lower end plane of the upper fixed seat 20, and the limit block 28 can be arranged on an upper stop pin 62 at the upper end plane of the drive motor 6 in a pressing and contacting way.

As a further preferred embodiment, each electrode cap storage unit 5 comprises an electrode support 51 and a cover plate 52, one or a plurality of electrode placing slots 511 are formed along the side walls of the electrode supports 51, the cover plates 52 can be detachably arranged on the electrode supports 51 and can be used for sealing the electrode placing slots 511 and compression springs 53 are arranged in the electrode placing slots 511; the terminals of compression springs 53 are fixedly connected with the electrode supports 51, push blocks 54 capable of pushing electrodes 8 to slide along the electrode placing slots 511 are arranged at the front ends of the compression springs 53, and head parts protruding out the cover plates 52 are formed on the front ends of the electrode supports 51; cap taking ports 512 are formed in the head parts of the electrode placing slots 511, baffle blocks 55 are arranged in the cap taking ports 512, and an elastic reset mechanism is connected with the baffle blocks 55 and drives the baffle blocks to block the cap taking ports 512.

As a further preferred embodiment, the elastic reset mechanism comprises baffle block supports arranged on the head parts, and hinged lugs, which are embedded into the side wall of the cap taking ports 512, are formed on the baffle block supports; baffle blocks 55 comprise hinged ends connected with the hinged lugs through the rotating shaft and baffle ends protruding into the cap taking ports 512, cambered surfaces which can fit the surfaces of the electrodes 8 are formed on the end planes of the baffle ends, and the baffle block supports are provided with reset elastic members connected with the baffle blocks 55.

As a further preferred embodiment, the reset elastic members are torsion springs 57 arranged on the rotating shaft 56.

As a further preferred embodiment, the electrode supports 51 or the baffle blocks 55 are provided with pressing plated 58 which protrude above the electrode placing slots from the side walls of the cap taking ports.

As a further preferred embodiment, guide slots 514 are formed in the left and right side walls of the electrode placing slots 511, and the two sides of the push blocks 54 are provided with guide strips embedded into the guide slots 514.

As a further preferred embodiment, the terminal of each electrode placing slot 51 is provided with a bottom cover 59 by the corresponding electrode support 51, and the terminals of the compression springs 53 are propped against the bottom covers 59.

As a further preferred embodiment, each electrode placing slot 511 comprises an upper electrode placing slot and a lower electrode placing slot which are respectively located at the upper side and lower side of each electrode support 51, and each cover plate 52 comprises an upper cover plate and a lower cover plate which respectively enclose the upper electrode placing slot and the lower electrode placing slot.

As a further preferred embodiment, the frame 1 comprises a base 10, a mounting plate 11, a tray frame 12 and a tray 13, wherein the mounting plate 11 is used for installing the drive motor 6 and the balanced floating unit 2, the tray frame 12 is located below the mounting plate 11 and the tray 13 is installed above the tray frame 12.

Figure 1:
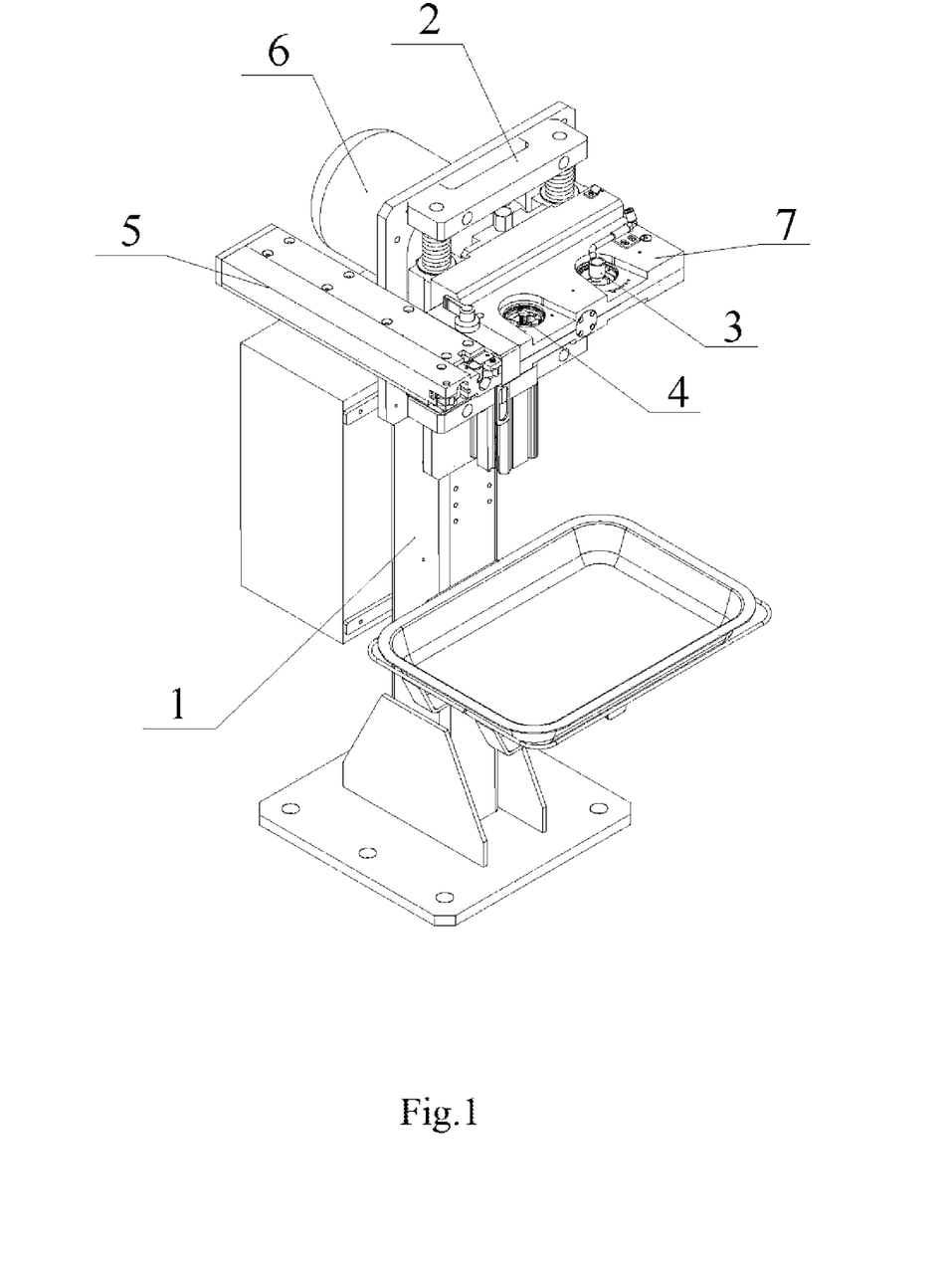
FIG. 1 is a schematic diagram of the electrode cap grinding and changing AIO machine.

One optimal embodiment of the electrode cap grinding and changing AIO machine is below:

As shown in FIG. 1, an electrode cap grinding and changing AIO (All-In-One) machine, comprising gear box host, a frame 1, a balanced floating unit 2, and electrode cap storage units 5. The gear box host, as a core part, is used for realizing grinding and cap dismounting functions. The gear box host is connected with the balanced floating unit 2 which is arranged on the frame 1, the frame 1 is arranged on the working table, and the electrode cap storage units 5 are arranged at the outermost ends of the two sides of the gear box host.

Figure 2:
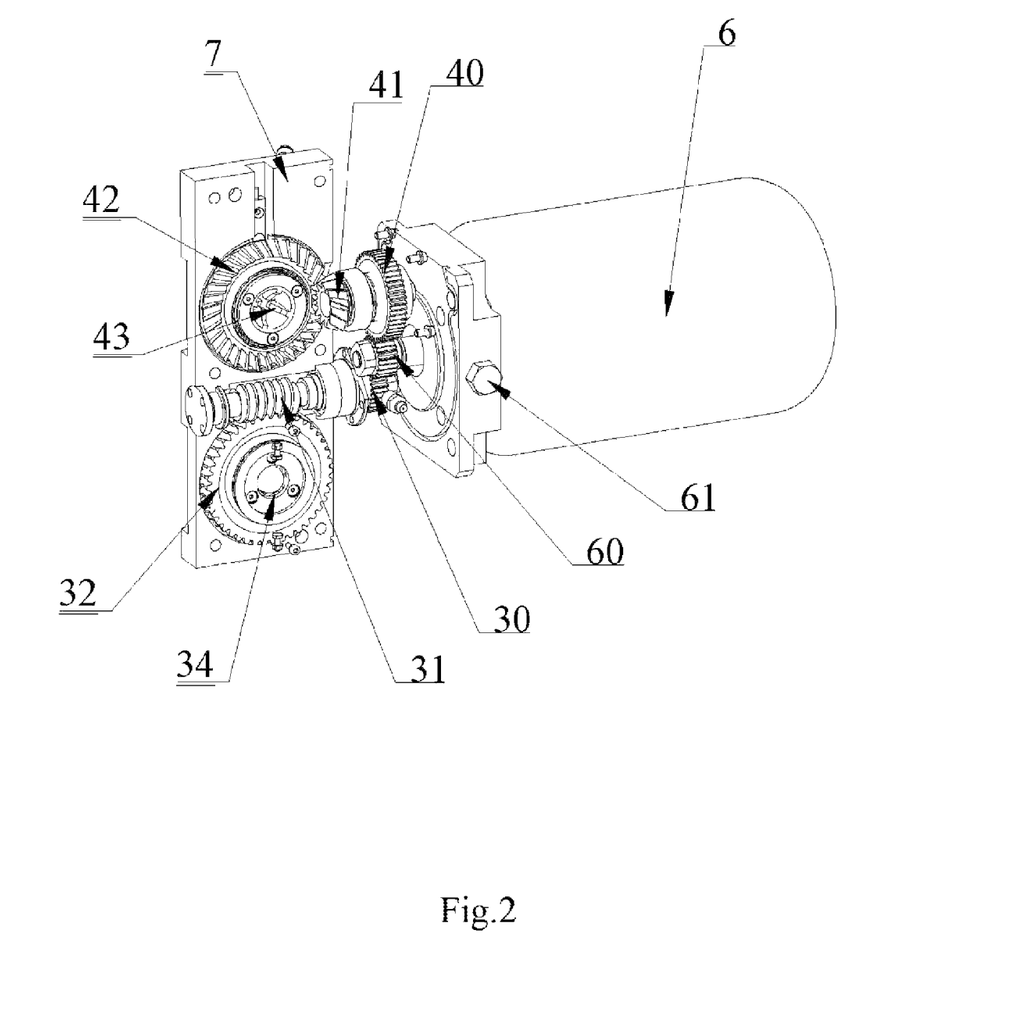
FIG. 2 is a schematic diagram of a cap dismounting unit and a cap repair unit in the electrode cap grinding and changing AIO machine.
Figure 3:
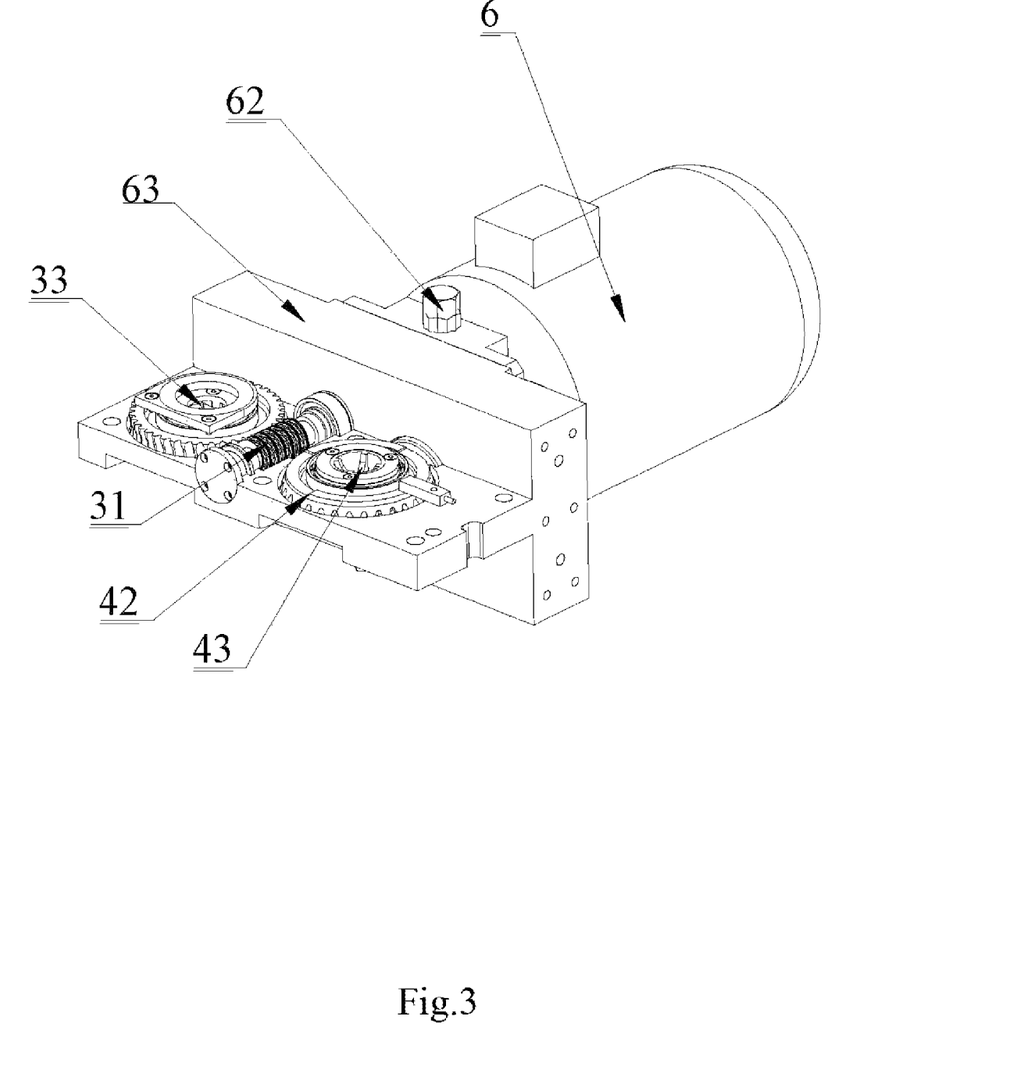
FIG. 3 is a schematic diagram of the cap dismounting unit and the cap repair unit in the electrode cap grinding and changing AIO machine from another angle.

A schematic diagram of the cap dismounting unit and the cap repair unit is as shown in FIGS. 2 and 3. The cap dismounting unit and the cap repair unit comprise an engine base 63, a working table 7, a motor adapter flange, a drive motor, an output shaft gear 60, a cap dismounting straight gear 30, a worm shaft 31, a cap dismounting worm 32, a grinding linear gear 40, a grinding bevel pinion 41, a grinding bevel gear wheel 42, an electrode cap gripper 33, a grinding cutter 43, an upper stop pin 62, a lower stopping pin 61, a radial ball bearing, deep groove ball bearings and a spring. The drive motor 6 is a power source of the electrode cap grinding and changing AIO machine, the motor switching flange is arranged on the engine base 63, and the output shaft gear 60 is arranged on the output shaft of the drive motor 6. The output shaft gear 60 is respectively engaged with the cap dismounting straight gear 30 and the grinding linear gear 40, the cap dismounting straight gear 30 is coaxially connected with the worm shaft 31 through a key, the worm shaft 31 is engaged with the cap dismounting worm 32 in a driving way and the electrode cap gripper 33 is connected in the center of the cap dismounting worm through a rotating shaft; the electrode cap gripper 33 is further provided with a pre-tightening spring 34; the grinding linear gear 40 and the grinding bevel pinion 41 are coaxially connected through a key, the grinding bevel gear wheel 42 is engaged with the grinding bevel pinion 41 in a driving way, and the grinding cutter 43 is arranged in the center of the grinding bevel gear wheel 42. The worm shaft 31 is arranged on the engine base 63 through the radial ball bearing and the deep groove ball bearings, the grinding bevel pinion 41 is arranged on the engine base 63 through the two deep groove ball bearings, the gaps among all driving gears and positions of the driving gears are regulated, and the working table 7 covers on the engine base 63, so as to play a role in closing and sealing. After the drive motor is powered to work in a normal condition, the grinding bevel gear wheel 42 rotates at constant speed based on the designed speed so as to drive the grinding cutter 43 to work by two-stage gear reduction. When the cap dismounting cap 32 rotates reversely, the gripper in the middle of the cap dismounting cap 32 unfolds to allow an electrode rod to protrude in, and the gripper clamps the electrode cap to dismount when the cap dismounting cap 32 rotates forwards.

Figure 4:
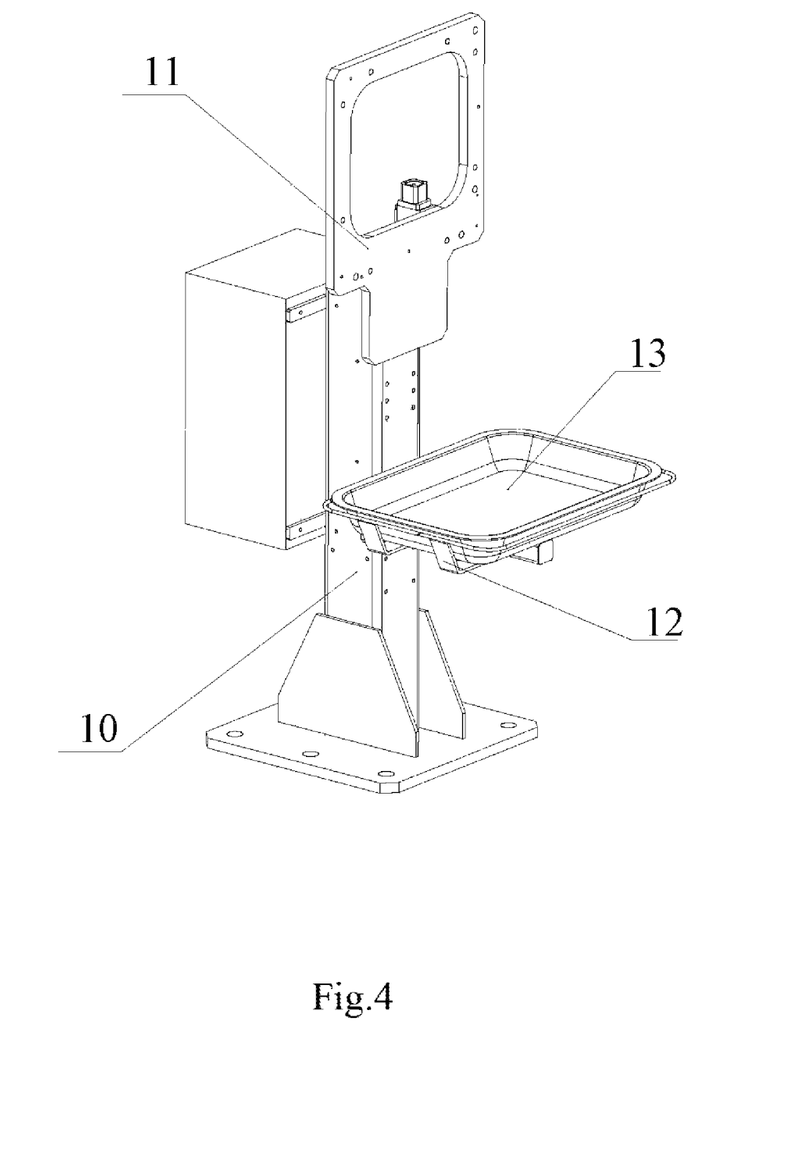
FIG. 4 is a schematic diagram of a frame in the electrode cap grinding and changing AIO machine.

A schematic diagram of the frame 2 is as shown in FIG. 4. The frame 1 comprises a base 10, a mounting plate 11, a tray frame 12, a tray 13, electric box connecting plates and an electric box. The base 10 is a support base 10 in the electrode cap grinding and changing AIO machine; the tray 13 is arranged on the base 10 through the tray frame 12, and the tray 13 is used for receiving waste scraps generated in the process of grinding the electrode cap and waste electrode caps dismounted; the electric box is arranged on the base 10 through two electric box connecting plates; the mounting plate 11 is fixedly arranged on the base 10 through two pins and four nails, the balanced floating unit is fixedly arranged on the mounting plate 11 and the mounting plate 11 plays a role in locating and connecting.

Figure 5:
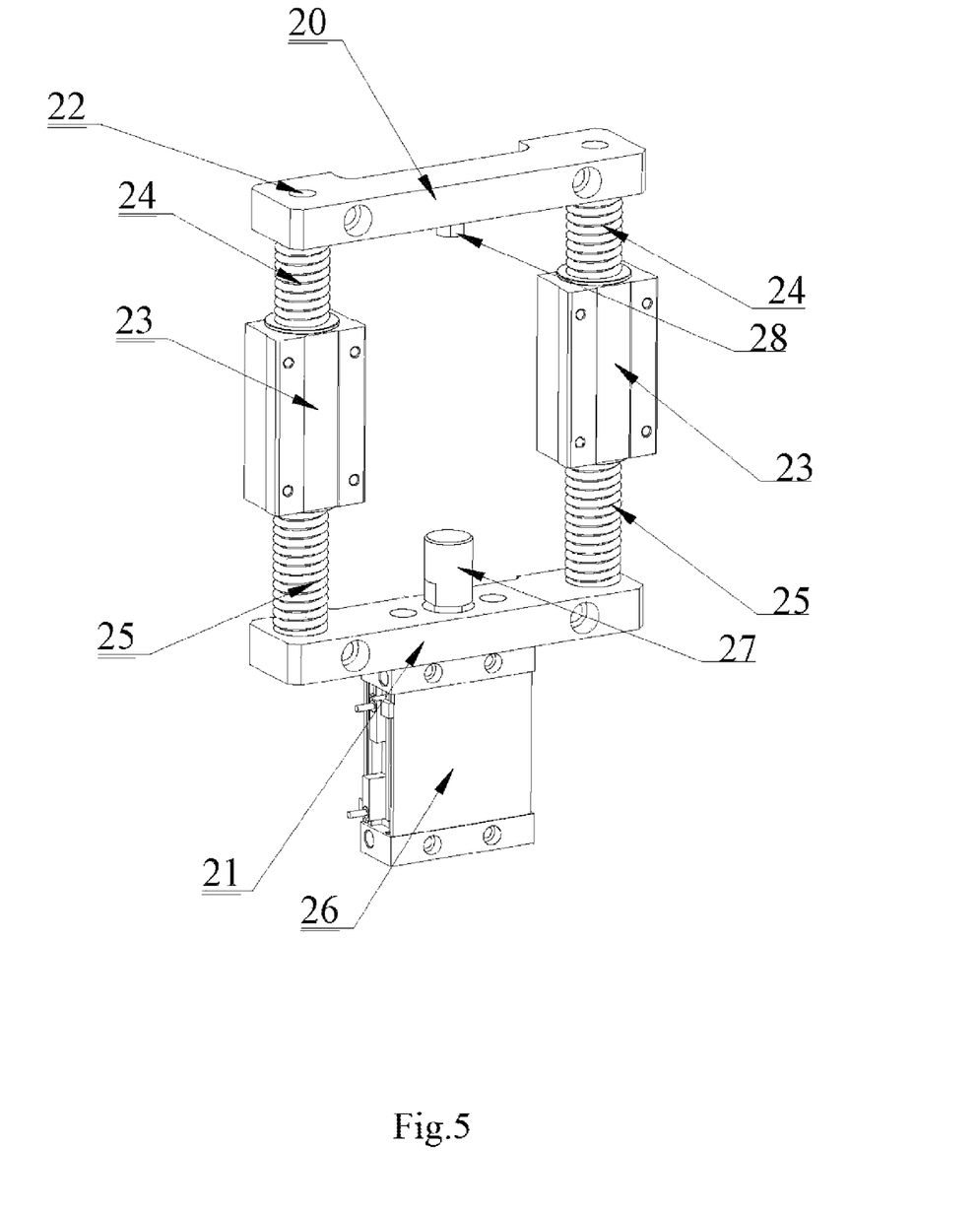
FIG. 5 is a schematic diagram of a balanced floating unit in the electrode cap grinding and changing AIO machine.
Figure 9:
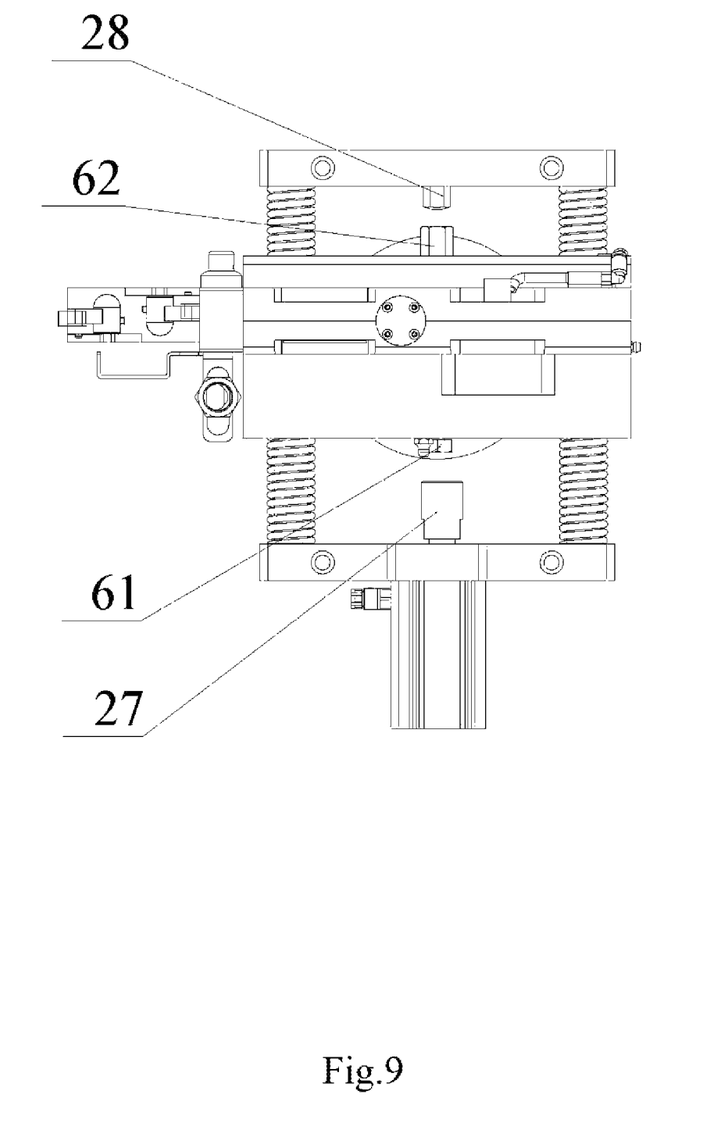
FIG. 9 is a diagrammatic drawing of an installation structure of the balanced floating unit in the electrode cap grinding and changing AIO machine.

A schematic diagram of the balanced floating unit 2 is as shown in FIGS. 5 and 9. The balanced floating unit comprises an upper fixed seat 20, a lower fixing base 21, guide shafts 22, a spring washer, a cylinder connecting head 27, an upper spring 24, a lower spring 25, a cylinder 26, linear bearings 23 and a limit block 28, wherein the balanced floating unit 2 is fixedly arranged on the mounting plate 11 of the base 10 through the upper fixed seat 20 and the lower fixed seat 21 in such a connecting way of locking by screws. The linear bearings 23 sleeve the guide shafts 22, the upper spring 24 and the lower spring 25 sleeve the two ends of the linear bearings 23 on the two guide shafts 22, and the two ends of the guide shafts 22 are locked by the upper fixed seat 20 and the lower fixed seat 21, the upper and lower springs are located in the compression state and regulating spacers are arranged between the upper spring 24 as well as the lower spring 25 and the linear bearings 23 so as to be convenient for assembling and regulating. The balanced floating unit 2 has the functions of damping and compliance, the gear box is in a floating state by the balanced floating unit 2 in the process of grinding the electrode cap. When the size of the repaired electrode cap is changed, the grinding positions can be regulated in accordance with the pressure change of the upper and lower electrode caps, so as to ensure grinding the upper and lower electrode caps uniformly and consistently. The gear box is located in the floating state by four initially compressed springs, so as to reduce the influence on the grinding quality by vibration, and reduce the deformation caused by the collision on the gear box host through a welding gun at the same time. In the process of dismounting and installing the electrode cap, the cylinder 26 works, and the cylinder connector 27 is jacked up to be in contact with the lower stop pin 61 of the gear box host, therefore the whole gear box host is located in the fixed position. The cylinder 26 is used for limiting the position of the gear box to be constant in the process of changing the electrode cap every time, and ensuring dismounting and assembling the electrode cap without any error every time.

Figure 6:
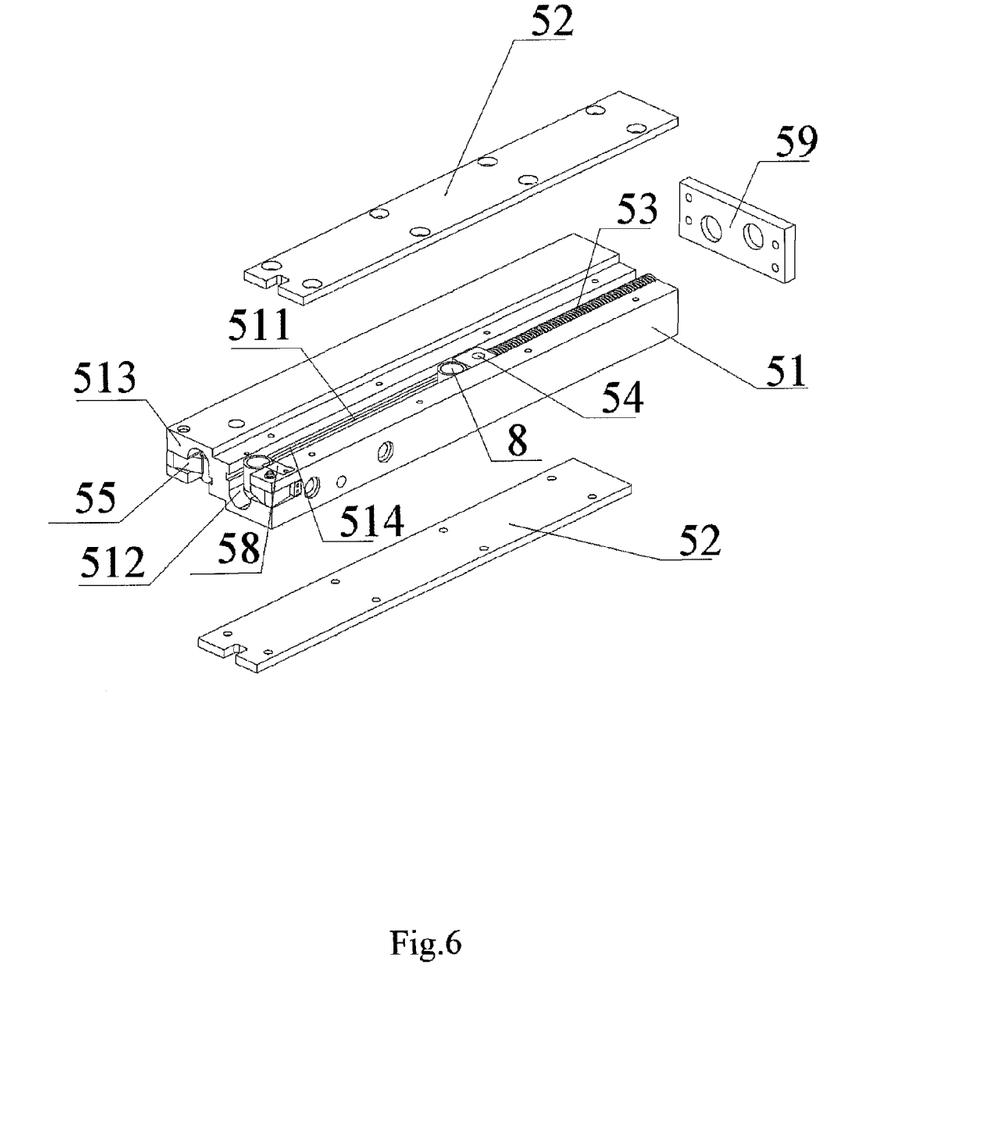
FIG. 6 is an exploded drawing of an electrode cap storage unit in the electrode cap grinding and changing AIO machine.
Figure 7:
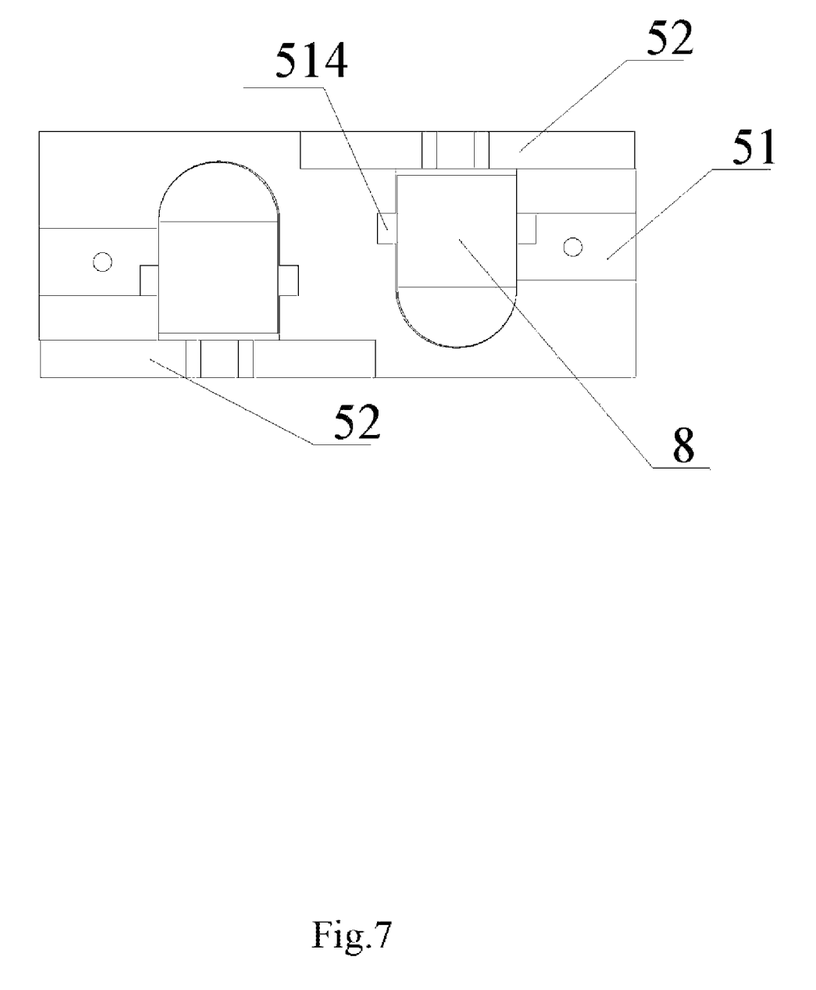
FIG. 7 is a sectional view of an electrode support of the electrode cap storage unit in the electrode cap grinding and changing AIO machine.
Figure 8:
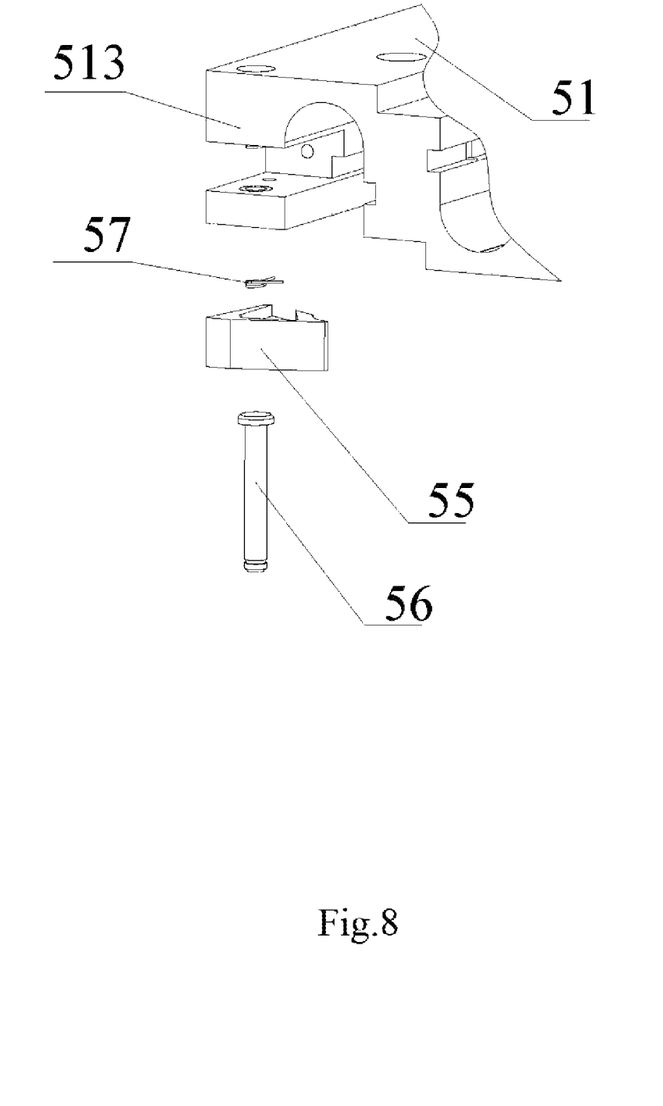
FIG. 8 is a diagrammatic drawing of an elastic reset mechanism of the electrode cap storage unit in the electrode cap grinding and changing AIO machine.

A schematic diagram of the electrode cap storage units 5 is as shown in FIGS. 6 and 8. Each electrode cap storage unit comprises an electrode support 51 and a cover 52, one or a plurality of electrode placing slots 511 are formed along the side wall of each electrode support 51, the cover plates 52 can be detachably arranged on the electrode supports 51 and can be used for sealing the electrode placing slots 511 and compression springs 53 are arranged in the electrode placing slots 511; bottom covers 59 are arranged at the terminals of the electrode placing slots 511 in the electrode supports 51, the terminals of compression springs 53 are fixedly propped against the bottom covers, and the front ends of the compression springs 53 are provided with push blocks 54 capable of pushing electrodes 8 to slide along the electrode placing slots 511; the left and right side walls of the electrode placing slots are provided with guide slots 514, the two sides of the push blocks 54 are provided with guide strips embedded into the guide slots 514, and the guide strips of the push blocks 54 can slide in the guide slots 515 of the electrode placing slots 511 in the electrode supports 51. The front ends of the electrode supports 51 are provided with head parts protruding out the cover plates 52, the cap taking ports 512 are formed in the head parts of the electrode placing slots 511, the cap taking ports 512 are provided with baffle blocks 55 and the elastic reset mechanism is connected with the baffle blocks 55 and drives the baffle blocks to block the cap taking ports 512. The elastic reset mechanism comprises baffle block supports arranged on the head parts, and the hinged lugs 513 embedded into the side walls of the cap taking ports 512 are formed on the baffle block supports; the baffle blocks 55 comprise hinged ends connected with the hinged lugs 513 through the rotating shaft 56 and the baffle ends protruding into the cap taking ports 512, the end planes of the baffle ends are provided with cambered surfaces capable of fitting with the surfaces of the electrodes 8, and the baffle block supports are provided with the reset elastic members connected with the baffle blocks 55. The reset elastic members are torsion springs 57 arranged on the rotating shaft 56, pressing plates 58 protruding above the electrode placing slots from the side walls of the cap taking ports 512 are formed on the electrode supports 51 or the baffle block supports.

Optimally, each electrode placing slot 511 comprises an upper electrode placing slot and a lower electrode placing slot which are respectively located at the upper side and lower side of each electrode support 51; after all electrodes 8 in the electrode placing slots are taken out, the electrode supports 51 can be inverted for further use; cover plates 52 comprise upper cover plates and lower cover plates which respectively enclose the upper electrode placing slots and the lower electrode placing slots.

When the electrodes 8 are filled in the electrode supports 51, the baffle blocks are squeezed out directly by the compression springs 53, and then the baffle blocks 55 restore to the primary positions by the elastic rest mechanism, therefore the electrodes 8 cannot fall out of the electrode supports 51. After the electrodes 8 blocked by the baffle blocks 55 are taken out, the corresponding next electrodes 8 are pushed out by the corresponding compression springs 53 in the push blocks 54 in the electrode placing slots 511. The electrode cap storage units 5 are driven by electric power, pneumatic and other power sources, thereby being simple and environment-friendly; furthermore, the electrodes 8 can be fed to the cap taking ports 512 automatically, therefore an electrode holder is convenient to take, and the time for stopping for changing the cap can be reduced. After all electrode caps are used out, the electrode caps need to be taken out manually, and new electrode caps are installed manually.

The better implementation ways of the electrode cap grinding and changing AIO (All-In-One) machine are specially specified, but the electrode cap grinding and changing AIO (All-In-One) machine is not limited to the embodiments. The technicians who are familiar with this field can do various equal deformations or replacements under the precondition that the spirit of the electrode cap grinding and changing AIO (All-In-One) machine cannot be broken, and all equal deformations or replacements are involved in the scope limited by the claims of this application.

The invention claimed is:

1. An electrode cap grinding and changing machine, comprising:
 a frame,
 a drive motor having an output end and a balanced floating unit, wherein the balanced floating unit is arranged on the frame, and the drive motor is arranged on the balanced floating unit, the output end of the drive motor penetrates through the balanced floating unit and then is connected with a working table having two sides, the two sides of the working table having a cap dismounting unit and a cap grinding unit drivably interconnected with the output end of the drive motor, and
 electrode cap storage units arranged at an outermost end of the two sides of the working table or on the frame.

2. The electrode cap grinding and changing machine according to claim 1, wherein the output end of the drive motor includes an output shaft gear; the cap dismounting unit comprises:
 a cap dismounting straight gear,
 a worm shaft coaxially connected with the cap dismounting straight gear,
 a cap dismounting worm wheel engaged with the worm shaft, and
 an electrode cap gripper connected in a center of the cap dismounting worm through a rotating shaft; wherein the electrode cap gripper including a pre-tightening spring; the cap grinding unit comprising a grinding straight gear, a grinding bevel pinion coaxially provided with the grinding straight gear, a grinding bevel gear wheel engaged with the grinding bevel pinion and a grinding cutter mounted in a center of the grinding bevel gear wheel; the output shaft gear being engaged with the cap dismounting straight gear and the grinding straight gear.

3. The electrode cap grinding and changing machine according to claim 1, characterized in that the balanced floating unit comprises an upper fixed seat and a lower fixed seat which are arranged on the frame, two guide shafts socketed between the upper fixed seat and the lower fixed seat, linear bearings sleeving the outer surfaces of the guide shafts, an upper spring which is installed between the upper fixed seat and the linear bearing and sleeves the outer surface of the corresponding guide shaft, a lower spring which is installed between the lower fixed seat and the linear bearing and sleeves the outer surface of the corresponding guide shaft and a cylinder installed at the lower end plane of the lower fixed seat; the output end of the cylinder penetrates through the lower fixed seat and then is connected with a cylinder connector, the cylinder connector can be arranged on a lower stop pin at the lower end plane of the drive motor in a pressing and contacting way, and the working table is arranged on the two linear bearings.

4. The electrode cap grinding and changing machine according to claim 3, characterized in that a limit block is arranged at the lower end plane of the upper fixed seat, and can be arranged on an upper stop pin at the upper end plane of the drive motor in a pressing and contacting way.

5. The electrode cap grinding and changing AIO machine according to claim 1, characterized in that each electrode cap storage unit comprises:
 an electrode supports and a cover plate,
 one or a plurality of electrode placing slots are formed along the side walls of the electrode supports, the cover plates can be detachably arranged on the electrode supports and can be used for sealing the electrode placing slots and compression springs are arranged in the electrode placing slots; wherein the terminals of compression springs are fixedly connected with the electrode supports, push blocks capable of pushing electrodes to slide along the electrode placing slots are arranged at the front ends of the compressing springs, and head parts protruding out the cover plates are formed on the front ends of the electrode supports; cap taking ports are formed in the head parts of the electrode placing slots, baffle blocks are arranged on the cap taking ports, and elastic mechanisms are connected with the baffle blocks and drive the baffle blocks to block the tap taking ports.

6. The electrode cap grinding and changing machine according to claim 5, characterized in that the elastic reset mechanism comprise:
 baffle block supports arranged on the head parts, and
 hinged lugs, wherein the hinged lugs are embedded into the side wall of the cap taking ports, are formed on the baffle block supports; the baffle blocks comprise hinged ends connected with the hinged lugs through the rotating shafts and baffle ends protruding into the cap taking ports, cambered surfaces which can fit the surfaces of the electrodes are formed on the end planes of the baffle ends, and the baffle block supports are provided with reset elastic members connected with the baffle blocks.

7. The electrode cap grinding and changing machine according to claim 6, characterized in that the reset elastic members are torsion springs arranged on the rotating shafts.

8. The electrode cap grinding and changing machine according to claim 6, characterized in that the electrode supports or the baffle block supports are provided with pressing plates which protrude above the electrode placing slots from the side walls of the cap taking ports.

9. The electrode cap grinding and changing machine according to claim 5, characterized in that guide slots are formed in the left and right side walls of the electrode placing slots, and the two sides of the push blocks are provided with guide strips embedded into the guide slots.

10. The electrode cap grinding and changing machine according to claim 5, characterized in that the terminals of the electrode placing slots are provided with bottom covers in the electrode supports, and the terminals of the compression springs are propped against the bottom covers.

11. The electrode cap grinding and changing machine according to claim 5, characterized in that each electrode placing slot comprises an upper electrode placing slot and a lower electrode placing slot which are respectively located at the upper side and lower side of the corresponding electrode support, and each cover plate comprises an upper cover plate and a lower cover plate which respectively enclose the upper electrode placing slot and the lower electrode placing slot.

12. The electrode cap grinding and changing machine according to claim 1, characterized in that the frame comprises:
- a base, a mounting plate,
- a tray frame and a tray, wherein the mounting plate is used for installing the drive motor and the balanced floating unit, the tray frame is located below the mounting plate, and the tray is installed above the tray frame.

* * * * *